Aug. 7, 1962 L. B. HAIGH ET AL 3,048,662

PABX SWITCHING SYSTEM

Filed May 17, 1957 2 Sheets-Sheet 1

Inventors
LESLIE B. HAIGH
MICHAEL BISK
THOMAS W. TUTTLE
By [signature]
Attorney

Inventors
LESLIE B. HAIGH
MICHAEL BISK
THOMAS W. TUTTLE
By [signature]
Attorney

United States Patent Office 3,048,662

Patented Aug. 7, 1962

3,048,662

PABX SWITCHING SYSTEM

Leslie B. Haigh, West Orange, N.J., Michael Bisk, New York, N.Y., and Thomas W. Tuttle, Nutley, N.J., assignors to International Telephone and Telegraph Corporation, Nutley, N.J., a corporation of Maryland Filed May 17, 1957, Ser. No. 659,790

7 Claims. (Cl. 179—22)

The present invention relates to automatic telephone exchanges and more particularly to private automatic branch exchanges (PABX) equipped with coordinate switches.

In known private automatic branch exchanges, of small capacity, the subscribers are connected to the verticals of coordinate switches while two horizontals are used to connect an inlet and an outlet of a link circuit. This arrangement requires twice as many switch outlets as there are link circuits.

Another known arrangement provides three common conductors to perform in and out switching and control functions. This arrangement is objectionable since it does not provide separate transmitter supply and other desirable control functions.

It is an object of the present invention to use only one outlet per link or other associated circuit having separate in, out and common conductors and means to selectively connect said in and out outlets.

Another object is to reduce the number of conductors required for connection of a link circuit to a coordinate switch.

Figure 1:
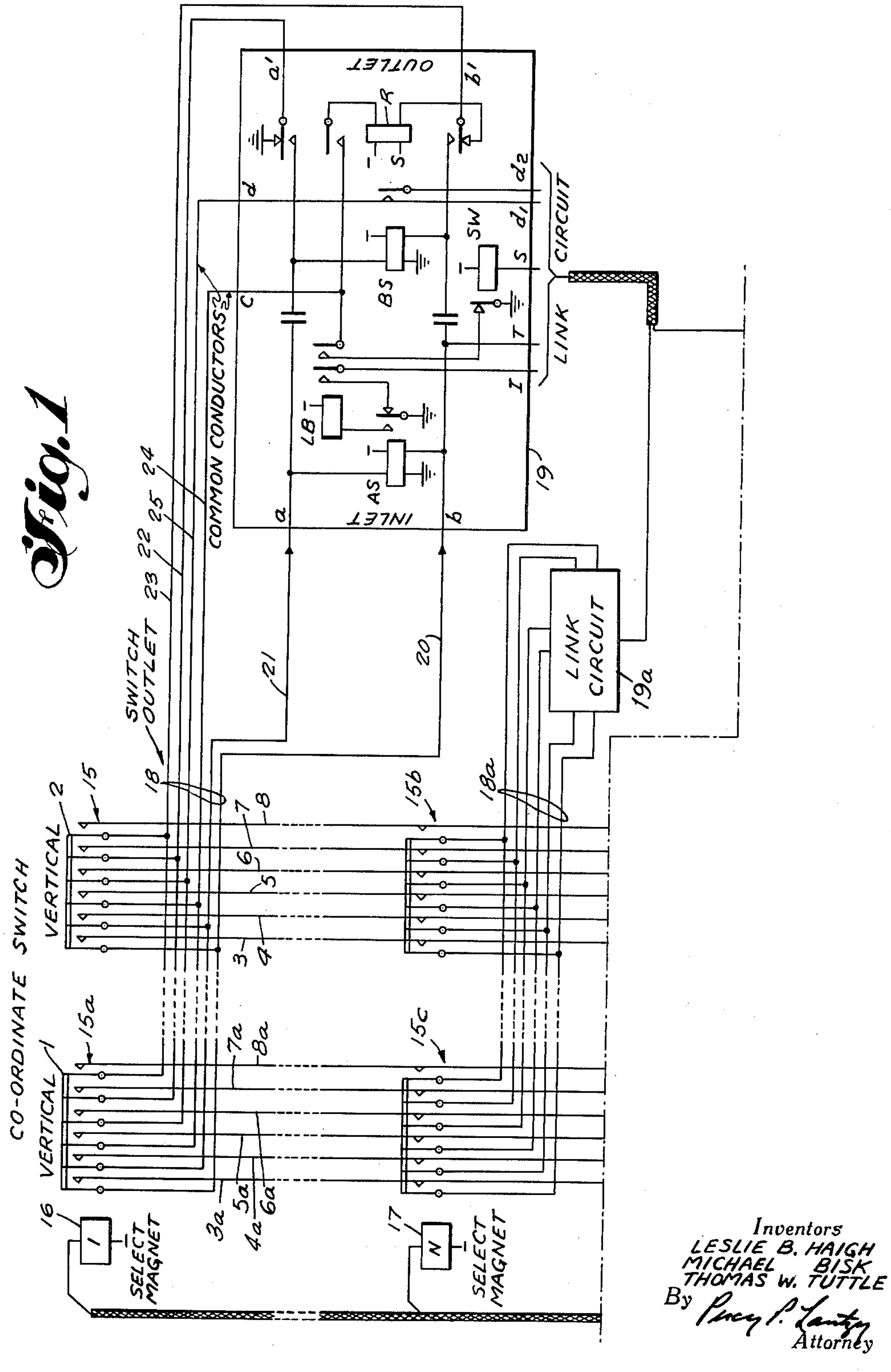
Figure 2:
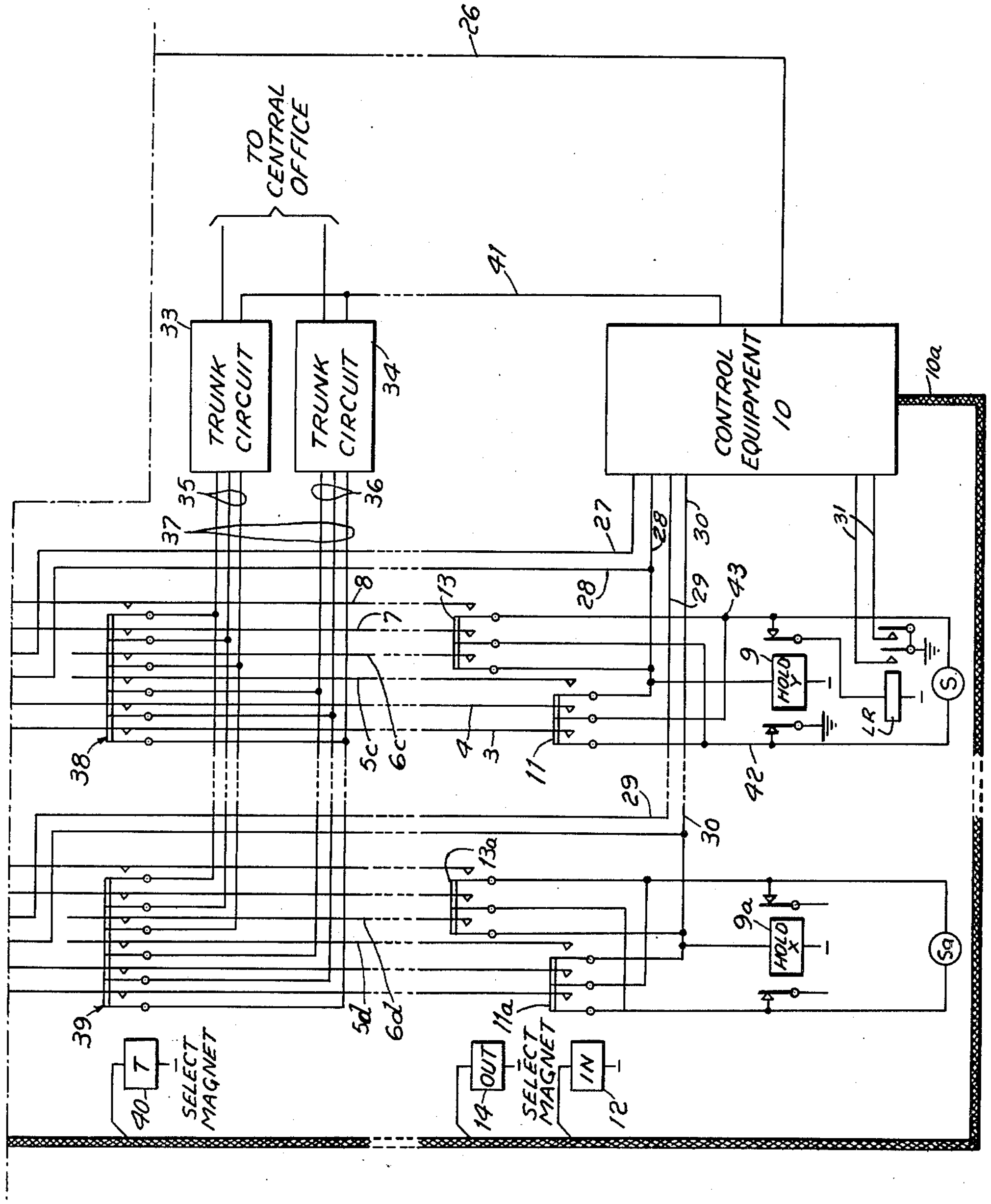

The above-mentioned and other objects of this invention will become more apparent by reference to the following description taken in conjunction with the accompanying drawings, in which:

FIG. 1 shows in schematic form a part of a coordinate switch with associated link circuits; and FIG. 2 shows additional parts of the coordinate switch with associated line, trunk and control equipment.

The purpose and the various functions of the disclosure will be described briefly followed by a detailed description of their significance with each other and the operation thereof.

In known private automatic branch exchanges, of the coordinate switch type, connections between two subscribers are established by two verticals of a coordinate switch and a link circuit, connected to the verticals by one or two horizontal levels. When separate transmitter supply and/or control functions are required for each subscriber, more conductors are required than the six supplied on the horizontal levels of standard switches. As a consequence two horizontal levels must be used for each link circuit; typical one and two level arrangements are shown in patents, 2,572,740, issued October 23, 1951 to William A. Malthaner and 2,714,630, issued August 2, 1955 to Nils F. Nilsson.

In the present invention the number of conductors between the coordinate switch and a link circuit is reduced by the use of conductors common to the calling and called lines and by means for selectively switching calling and called lines to corresponding parts of a transmission bridge in a link circuit. This arrangement permits the use of a standard transmisison bridge and requires only one six-conductor horizontal outlet for each link circuit. A coordinate switch of a type which may be used in the present invention is fully described in "The Design of Switching Circuits" by W. Keister, A. F. Ritchie and S. H. Washburn, pages 194–199.

Referring to FIG. 1, a coordinate switch comprising a plurality of verticals 1 and 2 having six vertical conductors as indicated at 3–8 and 3*a*–8*a* each associated with a hold magnet 9, 9*a* and a subscriber S and S*a*, respectively, control equipment 10, FIG. 2, in and out switching means 11, 11*a*, 12 and 13, 13*a*, 14 respectively, a plurality of select means 15–17 each having a horizontal outlet 18, 18*a*, and a plurality of link circuits 19, 19*a*, each having four individual conductors 20–23 and two common conductors 24, 25 connected to one of said horizontal outlets. The verticals have conductors such as 3, 4 and 7, 8 corresponding to the individual horizontal conductors 20–23 under control of the in and out switching means 11–14 and the select means 15–17, the other two vertical conductors such as 5, 6 being associated with the common horizontal conductors 24, 25 under control of the select means 15–17. One of these conductors is connected to the hold magnet 9 and the other is connected to the control equipment 10, FIG. 2. Control equipment 10 is well known in the art and includes an idle link circuit allotter, an idle trunk circuit allotter, common control relays, a common register arrangement, and a common source of dial tones arranged in a conventional manner to carry out the control functions of the present invention as described hereinafter. Examples of the form such control equipment could assume may be found in the above-cited patents to Nilsson and Malthaner and other patents relating to PABX switching systems.

Referring to FIGS. 1 and 2, a plurality of link circuits 19, 19*a* with associated control equipment 10 are shown in block form and part of one link is shown schematically. Each link circuit is connected to a horizontal outlet such as shown for link circuit 19 and outlet 18 by individual and common conductors 20–23 and 24, 25, respectively. In the link circuit these individual conductors are connected to a transmission bridge having separate transmitter supply and control functions AS and BS for the calling and the called subscribers. One of the common conductors 24 is connected to ground via contacts of relays LB and SW. The other common conductor 25 is connected to the control equipment via contacts of relay BS. The control equipment is connected to the link circuit 19, 19*a* via cable 26, to the coordinate switch via conductors 27–30, and to the associated line circuits LR via conductors 31. The operation of the circuit will now be described in detail.

*Local Call*

It will be assumed that subscriber S initiates a call. When the subscriber removes the receiver, not shown, a loop is closed which energizes relay LR thereby transmitting the identity of the calling line to the control equipment 10 over conductors 31. The idle link circuit allotter of equipment 10, well known to the art, coupled to cable 26 selects a free link circuit, for example 19, and energizes a corresponding select magnet 16 and the "in" switching magnet 12 of the coordinate switch over cable 10*a*. The control equipment further energizes the hold magnet 9 of the calling line S over conductor 28 causing the cordinate switch to establish a connection to the selected link 19. This circuit may be traced from the calling subscribers line S via the "in" switching means 11 of associated vertical, select means 15, individual conductors 20, 21 to relay AS in the link circuit. Relay AS energizes relay LB which prepares a circuit for the hold magnet 9. This circuit may be traced from ground via contacts of relays SW, LB common conductor 24, select means 15 of vertical 2, hold magnet 9, to battery. The hold magnet 9 opens the circuit for relay LR which de-energizes, causing part of the control equipment 10 to restore to normal condition, thereby releasing the switching and select magnets 12 and 16. The established connection is maintained by means of a hold magnet 9.

A dial tone is now transmitted to the calling subscriber from equipment 10 by known means (not shown), and it is assumed the subscriber dials a local number. The dialled number will be received and recorded in the register arrangement of the control equipment 10. When the called number is received, the control equipment 10 energizes a select-magnet 16 corresponding to engaged link 19 and also energizes the "out" switching magnet over cable 10*a*. The control circuit 10 further energizes the hold magnet 9*a* corresponding to the called subscriber S*a* over conductor 30 causing a connection to be established between the engaged link and the called line. This connection may be traced from the called subscriber S*a*, "out" switching means 13*a* select means 15*a*, individual conductors 22, 23 and relay R. One of these conductors is connected to ground and the other conductor is connected to ringing current, causing the called subscriber to be rung. A common circuit is provided for the hold magnets 9, 9*a* of the called and calling lines, via conductor 24, contacts of relays LB and SW to ground, thereby maintaining the connection established via verticals 1 and 2. As soon as the connection is established, the control equipment 10, the select and switching magnets 14 and 16 are restored to normal. When the called subscriber answers, relay R energizes, thereby completing a conversation circuit through the transmission bridge of link circuit 19. Separate transmitter supply and control functions are provided to the calling and called subscriber by relays AS and BS, respectively.

When conversation is completed and the calling subscriber restores the receiver, not shown, the circuit for relay AS is opened, causing this relay to de-energize. AS causes relay LB to de-energize, which in turn opens the circuit of the common conductor 24, thereby de-energizing the hold magnets 9 and 9*a* of the verticals of the calling and called subscribers. The link circuit releases.

*Trunk Call*

When a subscriber S initiates a trunk call, the circuit operation takes place as described for a local call up to the moment the called designation is recorded in the control equipment 10. This circuit will then prepare, a connection to a trunk circuit, not shown. The control equipment 10 also transmits a signal via relay BS of the associated link 19, the common conductor 25, the vertical 2 of the calling line S to the control equipment 10. This signal is used to identify the calling subscriber and is recorded in the register arrangement of the control equipment. The control equipment 10 energizes relay SW in the link 19, via cable 26, thereby opening the circuit for the holding magnet 9, of the calling line, causing the associated link and vertical to restore to normal. The control circuit remains operated and causes a connection to be established in well-known manner to a trunk circuit, not shown, whereafter the control equipment is restored to normal.

It will be evident that the common conductor 25 may be used to control other desirable functions.

While the invention has been described in connection with trunk circuits located on switches separate from the link circuits, FIG. 2 illustrates an arrangement whereby trunk circuits are located on the same coordinate switch as the link circuits. In this arrangement a predetermined number of outlets are reserved for trunk circuits. As an example, two trunk circuits 33, 34, each having three conductors 35, 36 are connected to a horizontal outlet 37. The vertical multiple conductors, such as 3, 4, 7, 8 and 3*a*, 4*a*, 7*a* and 8*a* remain connected from the switching means 11, 11*a*, 13, 13*a* through all select means such as 15–15*c* and 38, 39. The vertical conductors 5–6*a* remain connected for the select means 15–15*c* used for link circuits 19, 19*a* but are disconnected from the select means 38, 39 used for trunk circuits 33, 34. Conductors 5, 5*a* are connected by conductors 28, 30 to the control circuit 10, hold magnet 9, 9*a* and the switching means 11, 11*a*, 13, 13*a*, respectively. Conductors 6, 6*a* are connected to the control circuit 10 by conductors 27, 29. Conductors 5*c*, 5*d*, 6*c*, 6*d* are connected from the switch means 11, 11*a*, 13, 13*a*, respectively, to select means 38, 39 used for the trunk circuits 33, 34.

The circuit operation takes place as previously described but the switching means 11–14 have the dual function of selecting one out of two trunk circuits on trunk calls, as well as selecting one side of a link transmission circuit on a local call.

When a trunk call is made and both trunk and link circuits are located on the same switch, the circuit operation takes place as follows: A calling subscriber is connected via a link circuit 19 to a control equipment 10, which transmits dial tone and records the called number. For a trunk call the calling number is recorded in the control equipment 10, the link and the vertical of the connection is restored to normal as previously described. The control equipment by means of the idle trunk circuit allotter selects a free trunk circuit via conductor 41 in a well known manner.

As an example, it is assumed that the trunk circuit 34 is selected and the calling subscriber is connected to vertical 1 of the crossbar switch. The control equipment 10 will now energize switching magnet 12, select magnet 40 through cable 10*a* and hold magnet 9 through conductor 28 causing a connection to be established between the calling line and trunk circuit 34. This circuit may be traced from the subset S, conductors 42, 43, contacts of the switching means 11, conductors 3, 4, contacts of the selecting means 38, conductors 36 to the trunk circuit 34. A circuit is also completed for the holding magnet 9 via conductor 28, contacts of the switching means 11, conductor 5*c*, contacts of the select means 38, and one of the conductors 36 to a ground (not shown) in the trunk circuit 34. The hold magnet 9 will by means of this circuit be kept energized thereby maintaining the established connection when the control equipment is restored to normal. While the select means 38 connects both trunk circuits 33 and 34, only circuit 34 will be taken into use owing to the fact that conductors 6*c*, 7, 8, are not extended through the contacts of switching means 13. It is also to be understood that trunk circuit 33 is accessible to other subscriber lines, via vertical such as vertical 1, during the time trunk circuit 34 is engaged via vertical 2.

If the trunk circuit 33 had been selected in place of circuit 34, the circuit operation would have taken place in the same manner but switching magnet 14 would have been energized in place of magnet 12.

While the principles of the invention are described above in connection with specific apparatus and circuits, it is to be clearly understood that this description is made only by way of example and not as a limitation to the scope of our invention as set forth in the objects thereof and in accompanying claims.

We claim:

1. In a switching system, a coordinate switch comprising a vertical having six vertical conductors, a hold magnet, in and out switching means and a plurality of select means each having a horizontal outlet with six horizontal conductors, a double-ended link circuit having four individual conductors and two common conductors connected to the horizontal conductors of one of said horizontal outlets, four of said vertical conductors being connectable through four of said horizontal conductors to said four individual conductors and being connected to said in and out switching means, and the other two of said vertical conductors being connectable through the other two of said horizontal conductors to said common conductors with at least one of said two vertical conductors connected to said hold magnet.

2. In a switching system, a coordinate switch comprising a plurality of verticals each associated with a subscriber and having a hold magnet, in and out switching means, and a plurality of select means each common to said verticals and having a horizontal outlet, each horizontal outlet having a plurality of horizontal conductors, a link double-ended circuit having individual conductors and at least one common conductor connected to separate ones of the horizontal conductors of a horizontal outlet, each of said verticals having conductors corresponding to said individual conductors and connected to said in and out switching means and a conductor corresponding to said common conductor connected to the hold magnet of the respective vertical, and said link circuit having a transmission bridge coupled to said individual conductors and another circuit coupled to said common conductor.

3. In a switching system, a coordinate switch comprising a plurality of verticals each associated with a subscriber and having six vertical conductors, a hold magnet and in and out switching means, a plurality of select means each common to said verticals and having a horizontal outlet with six horizontal conductors, a plurality of double-ended link circuits each having four individual conductors connected to four horizontal conductors and two common conductors connected to two horizontal conductors of one of said horizontal outlets, four of said vertical conductors being associated with said four horizontal conductors and being connected to said in and out switching means and the other two of said vertical conductors being associated with said two horizontal conductors, one of said two vertical conductors being connected to the hold magnet of said vertical, and said link circuit having a transmission bridge coupled to said four individual conductors and control circuitry coupled to said two common conductors.

4. In a switching system, a coordinate switch comprising a vertical, in and out switching means and a plurality of select means each having a horizontal outlet consisting of a plurality of conductors, a line circuit associated with said switch, a first circuit having individual conductors and common conductors connected to the conductors of one of the horizontal outlets, said vertical having conductors corresponding to said individual conductors and connected to said in and out switching means and other conductors corresponding to said common conductors and connected to said line circuit, second and third circuits each having conductors connected to different ones of the horizontal conductors of one of the horizontal outlets and means for selectively connecting said other conductors through said in and out switching means to either of two horizontal conductors which are connected to said second and third circuits.

5. In a switching system, a coordinate switch comprising a plurality of verticals each having in and out switching means, a plurality of select means each common to said verticals and having a horizontal outlet consisting of a plurality of conductors, a line circuit associated with said switch, a first circuit having individual conductors and at least one common conductor connected to the conductors of one of the horizontal outlets, said vertical having conductors corresponding to said individual conductors and connected to said in and out switching means and another conductor corresponding to said common conductor and connected to said line circuit, trunk circuits each having conductors connected to different ones of the horizontal conductors of one of the horizontal outlets and means for selectively connecting said another conductor through said in and out switching means to either of two horizontal conductors which are connected to said trunk circuits.

6. In a switching system, a coordinate switch comprising a plurality of verticals each associated with a subscriber and having a line circuit, in and out switching means and a plurality of select means each common to said verticals and having a horizontal outlet, each horizontal outlet having a plurality of horizontal conductors, a double-ended link circuit having individual conductors and at least one common conductor connected to separate ones of the horizontal conductors of a selected horizontal outlet, each of said verticals having conductors corresponding to said individual conductors and connected to said in and out switching means, trunk circuits each having conductors connected to different ones of the horizontal conductors of a given horizontal outlet, said verticals each having a conductor corresponding to the common conductor of said link circuit and connected to said line circuit around the horizontal conductors of said selected horizontal outlet, and switching means for selectively coupling said conductor connected to said line circuit to either of two horizontal conductors of said given horizontal outlet which are connected to said trunk circuits.

7. In a switching system, a coordinate switch comprising a vertical, in and out switching means and a plurality of select means each having a horizontal outlet consisting of a plurality of conductors, a line circuit associated with said switch, a first circuit having individual conductors and common conductors connected to the conductors of one of the horizontal outlets, said vertical having conductors corresponding to said individual conductors and connected to said in and out switching means and other conductors corresponding to said common conductors, one of said other conductors being connected to said line circuit, second and third circuits each having conductors connected to different ones of the horizontal conductors of one of the horizontal outlets and means for selectively connecting said line circuit through said in and out switching means to either of two horizontal conductors which are connected to said second and third circuits.

References Cited in the file of this patent

UNITED STATES PATENTS

| | | |
|---|---|---|
| 2,136,620 | King | Nov. 15, 1938 |
| 2,400,061 | Abbott et al. | May 14, 1946 |
| 2,522,000 | Shepherd | Sept. 12, 1950 |
| 2,588,052 | Shepherd | Mar. 4, 1952 |
| 2,674,657 | Bellamy et al. | Apr. 6, 1954 |